US012182620B2

(12) United States Patent
Agarwal

(10) Patent No.: US 12,182,620 B2
(45) Date of Patent: Dec. 31, 2024

(54) SYSTEMS AND METHODS WITH INTEGRATED MEMORY POOLING AND DIRECT SWAP CACHING

(71) Applicant: Microsoft Technology Licensing, LLC, Redmond, WA (US)

(72) Inventor: Ishwar Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 480 days.

(21) Appl. No.: 17/689,553

(22) Filed: Mar. 8, 2022

(65) Prior Publication Data
US 2023/0229498 A1 Jul. 20, 2023

Related U.S. Application Data

(60) Provisional application No. 63/300,519, filed on Jan. 18, 2022.

(51) Int. Cl.
*G06F 12/08* (2016.01)
*G06F 9/50* (2006.01)
(Continued)

(52) U.S. Cl.
CPC .......... *G06F 9/5016* (2013.01); *G06F 9/5022* (2013.01); *G06F 12/0238* (2013.01);
(Continued)

(58) Field of Classification Search
CPC ...... G06F 9/5016; G06F 9/5022; G06F 12/02; G06F 12/0238; G06F 12/08;
(Continued)

(56) References Cited

U.S. PATENT DOCUMENTS 8,726,129 B1 * 5/2014 Aguilera ............ G06F 11/1088
719/325
11,210,218 B1 12/2021 Tavallaei et al.
(Continued)

FOREIGN PATENT DOCUMENTS

EP 2709018 A1 * 3/2014 ............ G06F 12/08
WO WO-2006004881 A1 * 1/2006 ......... G06F 12/0246
(Continued)

OTHER PUBLICATIONS

Q. Zhang, L. Liu, G. Su and A. Iyengar, "MemFlex: A Shared Memory Swapper for High Performance VM Execution," in IEEE Transactions on Computers, vol. 66, No. 9, pp. 1645-1652, Sep. 1, 2017.*

(Continued)

*Primary Examiner* — Pierre Michel Bataille
(74) *Attorney, Agent, or Firm* — Ranjeev Singh; Singh Law, PLLC

(57) ABSTRACT

Systems and methods related to integrated memory pooling and direct swap caching are described. A system includes a compute node comprising a local memory and a pooled memory. The system further includes a host operating system (OS) having initial access to: (1) a first swappable range of memory addresses associated with the local memory and a non-swappable range of memory addresses associated with the local memory, and (2) a second swappable range of memory addresses associated with the pooled memory. The system further includes a data-mover offload engine configured to perform a cleanup operation, including: (1) restore a state of any memory content swapped-out from a memory location within the first swappable range of memory addresses to the pooled memory, and (2) move from the local memory any memory content swapped-in from a (Continued)

memory location within the second swappable range of memory addresses back out to the pooled memory.

20 Claims, 9 Drawing Sheets

(51) Int. Cl.
*G06F 12/02* (2006.01)
*G06F 12/06* (2006.01)
*G06F 12/0891* (2016.01)

(52) U.S. Cl.
CPC ...... *G06F 12/0891* (2013.01); *G06F 12/0615* (2013.01); *G06F 2209/5011* (2013.01); *G06F 2209/503* (2013.01); *G06F 2209/509* (2013.01); *G06F 2212/254* (2013.01)

(58) Field of Classification Search
CPC .. G06F 12/0891; G06F 12/0615; G06F 12/06; G06F 2209/5011; G06F 2209/503; G06F 2209/509; G06F 2212/254
See application file for complete search history.

(56) References Cited

U.S. PATENT DOCUMENTS

| | | | | |
|---|---|---|---|---|
| 11,416,395 | B2 * | 8/2022 | Ray | G06F 12/0868 |
| 2012/0284587 | A1 * | 11/2012 | Yu | G06F 12/0868 |
| | | | | 711/E12.008 |
| 2015/0046636 | A1 * | 2/2015 | Seo | G06F 12/0246 |
| | | | | 711/103 |
| 2019/0258420 | A1 * | 8/2019 | Olderdissen | G06F 3/0604 |
| 2019/0370043 | A1 * | 12/2019 | Olderdissen | G06F 3/0604 |
| 2020/0125503 | A1 | 4/2020 | Graniello et al. | |
| 2020/0371692 | A1 * | 11/2020 | Van Doorn | G06F 3/0631 |
| 2021/0200667 | A1 * | 7/2021 | Bernstein | G06F 3/0658 |
| 2021/0216452 | A1 | 7/2021 | Muralidhara et al. | |
| 2022/0066827 | A1 | 3/2022 | Tavallaei et al. | |
| 2022/0066935 | A1 | 3/2022 | Tavallaei et al. | |
| 2022/0365688 | A1 * | 11/2022 | Perry | G06F 3/0683 |

FOREIGN PATENT DOCUMENTS

| | | | | |
|---|---|---|---|---|
| WO | WO-2006135999 A1 * | 12/2006 | | G06F 12/126 |
| WO | WO-2021001725 A1 * | 1/2021 | | G06F 12/0246 |

OTHER PUBLICATIONS

K. Qazi and S. Romero, "Remote Memory Swapping for Virtual Machines in Commercial Infrastructure-as-a-Service," 2019 4th International Conference on Computing, Communications and Security (ICCCS), Rome, Italy, 2019, pp. 1-8.*
P. Zhang, X. Li, R. Chu and H. Wang, "HybridSwap: A scalable and synthetic framework for guest swapping on virtualization platform," 2015 IEEE Conference on Computer Communications (INFOCOM), Hong Kong, China, 2015, pp. 864-872.*
Dario Korolija1, Dimitrios Koutsoukos1, Kimberly Keeton2, Konstantin Taranov1, Dejan Miloji˜ci´c3, Gustavo Alonso1, "Farview: Disaggregated Memory with Operator Off-loading for Database Engines" https://arxiv.org/pdf/2106.07102, Jun. 13, 2021.*
Venkatraman, Kirtana, "Virtual machine memory allocation andplacement on Azure Stack", Retrieved From: https://azure.microsoft.com/en-us/blog/virtual-machine-memory-allocation-and-placement-on-azure-stack/, Jun. 11, 2019, 8 Pages.
"Compute Express LinkTM (CXLTM) Specification", In White Paper of CXL, Oct. 26, 2020, 628 Pages.
"Hyper-V Virtual NUMA Overview", Retrieved From: https://docs.microsoft.com/en-us/previous-versions/windows/it-pro/windows-server-2012-r2-and-2012/dn282282(v=ws.11), Oct. 25, 2016, 14 Pages.
"International Search Report and Written Opinion Issued in PCT Application No. PCT/US22/048333", Mailed Date: Feb. 21, 2023, 11 Pages.

* cited by examiner

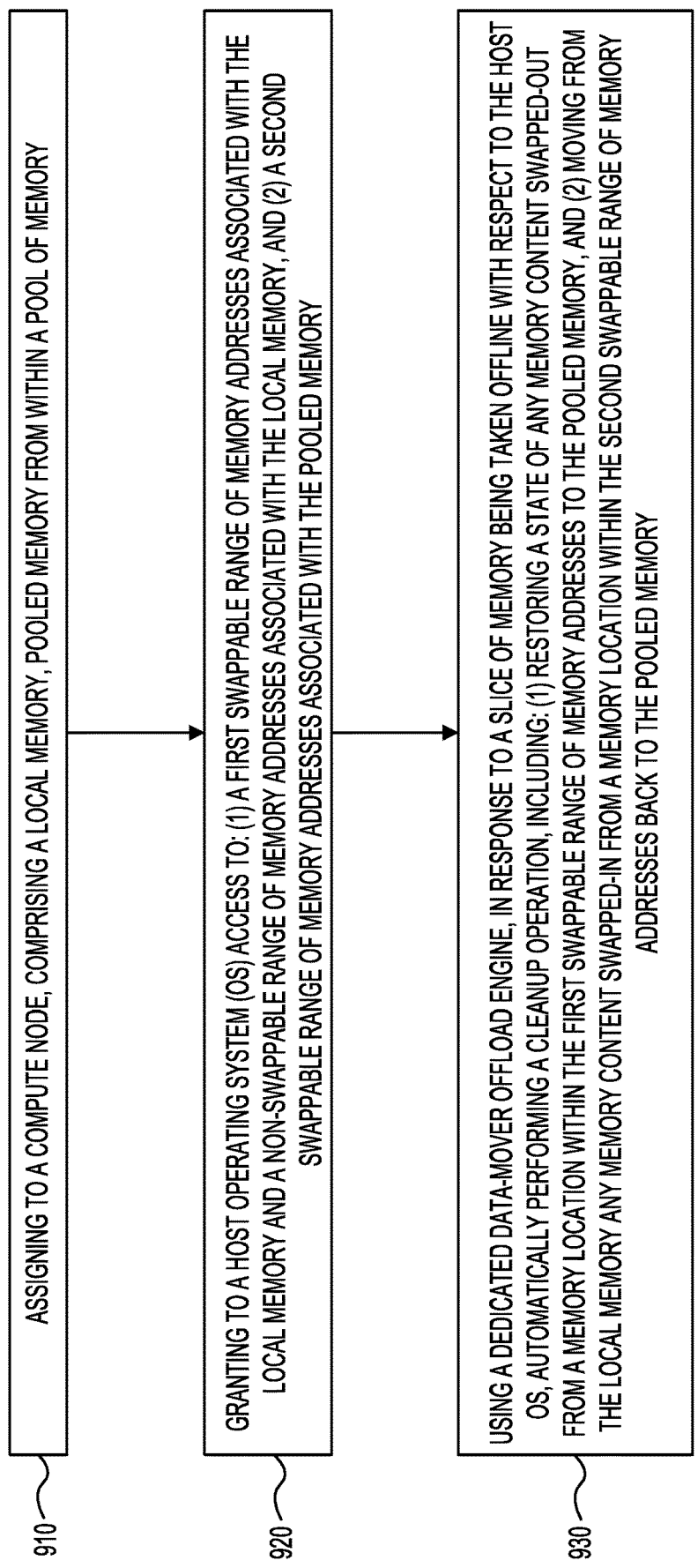

SYSTEMS AND METHODS WITH INTEGRATED MEMORY POOLING AND DIRECT SWAP CACHING

CROSS-REFERENCE TO A RELATED APPLICATION

This application claims the benefit of U.S. Provisional Application No. 63/300,519, filed Jan. 18, 2022, titled "SYSTEMS AND METHODS WITH INTEGRATED MEMORY POOLING AND DIRECT SWAP CACHING," the entire contents of which are hereby incorporated herein by reference.

BACKGROUND

Multiple users or tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. The compute, storage, and networking resources may be provisioned using a host operating system (OS) installed on a compute node (e.g., a server) in a data center. Each host OS may allow multiple compute entities, such as a virtual machine, to access the compute and memory resources associated with a respective compute node. Because of the uneven usage of memory resources by the compute entities supported by the host OS, the amount of memory resources may not be allocated efficiently.

SUMMARY

In one example, the present disclosure relates to a system including a compute node comprising a local memory, coupled to a pooled memory system, where the pooled memory system comprises pooled memory. The system may further include a host operating system (OS) having initial access to: (1) a first swappable range of memory addresses associated with the local memory and a non-swappable range of memory addresses associated with the local memory, and (2) a second swappable range of memory addresses associated with the pooled memory.

The system may further include a data-mover offload engine configured to, in response to a slice of memory being taken offline with respect to the host OS, perform a cleanup operation, including: (1) restore a state of any memory content swapped-out from a memory location within the first swappable range of memory addresses to the pooled memory, and (2) move from the local memory any memory content swapped-in from a memory location within the second swappable range of memory addresses back out to the pooled memory.

In another example, the present disclosure relates to a method including assigning to a compute node, comprising a local memory, pooled memory from within a pool of memory. The method may further include granting to a host operating system (OS) access to: (1) a first swappable range of memory addresses associated with the local memory and a non-swappable range of memory addresses associated with the local memory, and (2) a second swappable range of memory addresses associated with the pooled memory.

The method may further include using a dedicated data-mover offload engine, in response to a slice of memory being taken offline with respect to the host OS, automatically performing a cleanup operation, including: (1) restoring a state of any memory content swapped-out from a memory location within the first swappable range of memory addresses to the pooled memory, and (2) moving from the local memory any memory content swapped-in from a memory location within the second swappable range of memory addresses back out to the pooled memory.

In yet another example, the present disclosure relates to a system including a first compute node comprising a first local memory, coupled to a pooled memory system, where the pooled memory system comprises pooled memory. The system may further include a first host operating system (OS), associated with the first compute node, having initial access to: (1) a first swappable range of memory addresses associated with the first local memory and a first non-swappable range of memory addresses associated with the first local memory, and (2) a second swappable range of memory addresses associated with the pooled memory. The system may further include a second compute node comprising a second local memory, different from the first local memory, coupled to the pooled memory system. The system may further include a second host operating system (OS), associated with the second compute node, having initial access to: (1) a third swappable range of memory addresses associated with the second local memory and a third non-swappable range of memory addresses associated with the second local memory, and (2) a fourth swappable range of memory addresses associated with the pooled memory. The system may further include a first data-mover offload engine configured to, in response to a first slice of memory being taken offline with respect to the first host OS, perform a first cleanup operation, including: (1) restore a state of any memory content swapped-out from a memory location within the first swappable range of memory addresses to the pooled memory, and (2) move from the first local memory any memory content swapped-in from a memory location within the second swappable range of memory addresses back out to the pooled memory. The system may further include a second data-mover offload engine, different from the first data-mover engine, configured to, in response to a second slice of memory being taken offline with respect to the second host OS, perform a second cleanup operation, including: (1) restore a state of any memory content swapped-out from a memory location within the third swappable range of memory addresses to the pooled memory, and (2) move from the second local memory any memory content swapped-in from a memory location within the fourth swappable range of memory addresses back out to the pooled memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 9 shows a flow chart of an example method for integrated memory pooling and direct swap caching.

DETAILED DESCRIPTION

Figure 1:
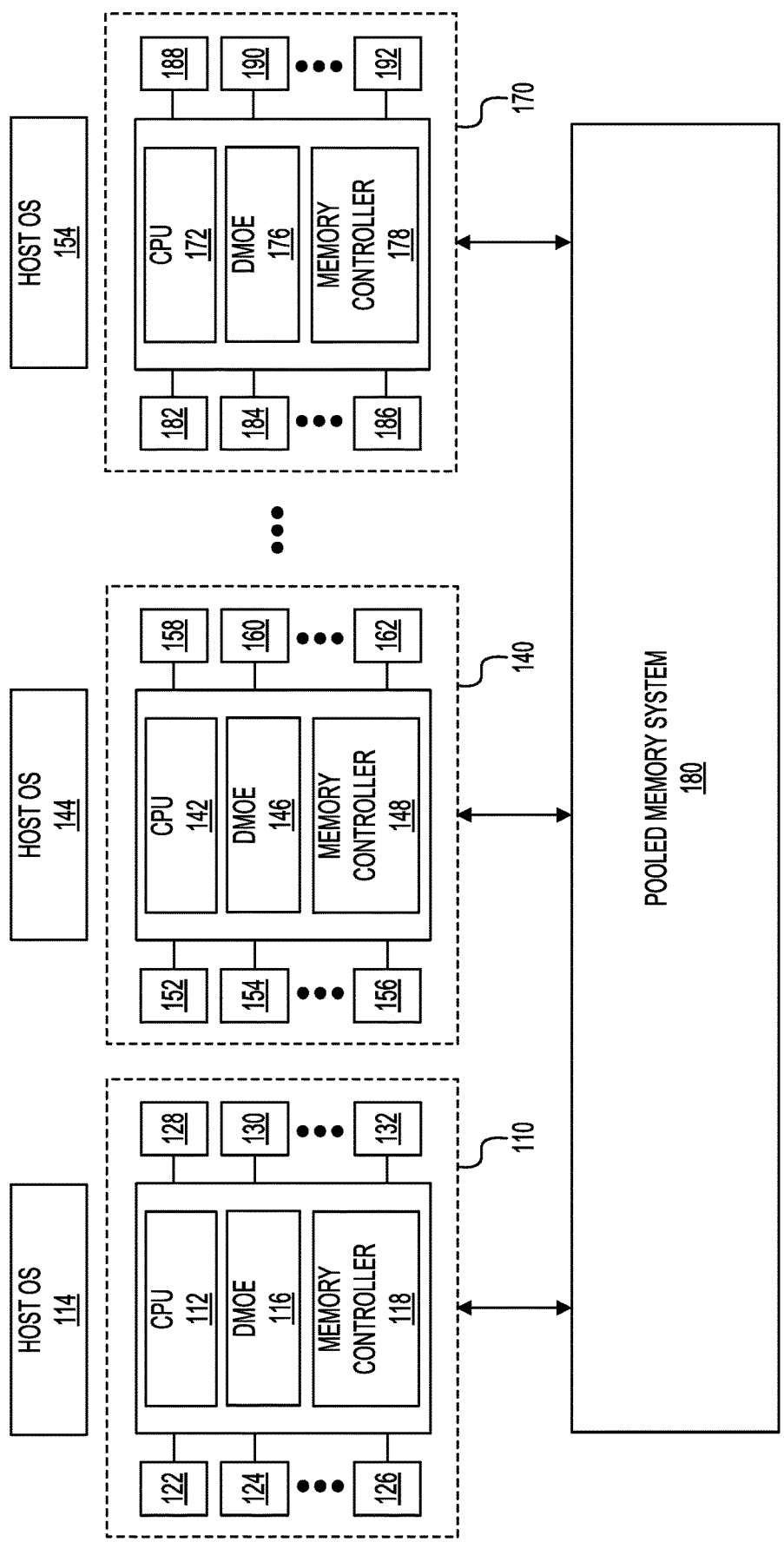
FIG. 1 is a block diagram of a system including compute nodes coupled with a logical pooled memory system in accordance with one example.

Examples described in this disclosure relate to systems and methods with integrated memory pooling and direct swap caching. Certain examples relate to leveraging memory pooling and direct swap caching for use with a host operating system (OS) in a computing system or a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Compute entities may be executed using compute and memory resources of the data center. As used herein, the term "compute entity" encompasses, but is not limited to, any executable code (in the form of hardware, firmware, software, or in any combination of the foregoing) that implements a functionality, a virtual machine, an application, a service, a micro-service, a container, or a unikernel for serverless computing. Alternatively, compute entities may be executing on hardware associated with an edge-compute device, on-premises servers, or other types of systems, including communications systems, such as base stations (e.g., 5G or 6G base stations).

Consistent with the examples of the present disclosure, a host OS may have access to a combination of the local physical memory (e.g., local DRAM) and an allocated portion of the pooled memory. As an example, the compute nodes in a data center may be allocated pooled memory exposed by a pooled memory system, which then may be made accessible to the host OS running on the compute node. The pooled memory relates to memory that includes any physical memory that is shared by multiple compute nodes. The overall cost of the memory deployed as part of the compute nodes may be lowered by using techniques that allow for the combining of cheaper memory with less memory than otherwise required. Memory pooling may advantageously help with requiring less memory since memory may be assigned or unassigned from the memory pool to each compute node. In addition, the data/instructions associated with a host OS may be swapped in and out of the local memory from/to the pooled memory. In such an arrangement, the local memory may be viewed as the "Near Memory" and the pooled memory may be viewed as the "Far Memory." In this arrangement, the near memory (e.g., the local memory) may be implemented using expensive memory and the far memory (e.g., the pooled memory) may be implemented using cheaper memory. As an example, the expensive memory may correspond to double data rate (DDR) dynamic random access memory (DRAM) that operates at a higher data rate (e.g., DDR2 DRAM, DDR3 DRAM, DDR4 DRAM, or DDR5 DRAM) and the cheaper memory may correspond to DRAM that operates at a lower data rate (e.g., DRAM or DDR DRAM). Other cost differences may be a function of the reliability or other differences in quality associated with the near memory versus the far memory.

FIG. 1 is a block diagram of a system 100 including compute nodes 110, 140, and 170 coupled with a logical pooled memory system 180 in accordance with one example. Each compute node may include compute and memory resources. As an example, compute node 110 may include a central processing unit (CPU) 112; compute node 140 may include a CPU 142; and compute node 170 may include a CPU 172. Although each compute node in FIG. 1 is shown is having a single CPU, each compute node may include additional CPUs, and other devices, such as graphics processor units (GPU)s, field programmable gate arrays (FPGA)s, application specific integrated circuits (ASIC)s, or other devices. In addition, each compute node may include local memory, which may be organized as memory modules. As an example, compute node 110 may include memory modules 122, 124, 126, 128, 130, and 132. Compute node 140 may include memory modules 152, 154, 156, 158, 160, and 162. Compute node 170 may include memory modules 182, 184, 186, 188, 190, and 192. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as local memory.

With continued reference to FIG. 1, each compute node may further include a data-mover offload engine (DMOE). As described herein, the DMOEs may perform cleanup operations required because of the use of both memory pooling and direct swap caching. As an example, compute node 110 may include DMOE 116, compute node 140 may include DMOE 146, and compute node 170 may include DMOE 176. Each compute node may further include one or more memory controllers. As an example, compute node 110 may include memory controller 118, compute node 140 may include memory controller 148, and compute node 170 may include memory controller 178. The memory controller included in such nodes may be a double dynamic rate (DDR)

DRAM controller in case the memory modules include DDR DRAM. In addition, each memory controller may include additional hardware logic to allow an interface with not only the respective CPU but also the respective DMOE. The DMOE (e.g., any of DMOE 116, 146, or 176) may be implemented as a hardware engine, including finite state machines, programmable registers, buffers, and high-speed interfaces to allow for the movement of data at a high speed. In one example, the DMOE may be implemented as part of a system-on-chip (SoC) comprising the CPU. From a hardware perspective, in one example, DMOE (e.g., any of DMOE 116, 146, or 176) may be implemented as a fixed-function accelerator with finite state machines. The fixed-function accelerator may be implemented using a field programmable gate array (FPGA) or using an application specific integrated circuit (ASIC). From a software standpoint, the DMOE (e.g., any of DMOE 116, 146, or 176) may appear as a Peripheral Component Interconnect Express (PCIe) device for which the host OS can load a driver and submit jobs consistent with the PCIe specification.

Each compute node may be configured to execute several compute entities. In this example, compute node 110 may have host OS 114 installed on it; compute node 140 may have host OS 144 installed on it, and compute node 170 may have host OS 174 installed on it. Logical pooled memory system 180 may include logical pooled memory, which may include several memory modules. Although not shown in FIG. 1, logical pooled memory system 180 may include a logical pooled memory controller (described later). Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as pooled memory.

Any of host OS (e.g., host OS 114, 144, or 174), being executed by any of compute nodes (e.g., compute node 110, 140, or 170), may access at least a portion of the physical memory included as part of pooled memory system 180. Pooled memory system 180 may assign a portion of the pooled memory to the compute node when the compute node powers on or as part of allocation/deallocation operations. The assigned portion may include one or more "slices" of memory, where a slice refers to any smallest granularity of portions of memory managed by the pooled memory controller (e.g., a memory page or any other block of memory aligned to a slice size). A slice of memory is allocated at most to only one host at a time. Any suitable slice size may be used, including 1 GB slices, 2 GB slices, 8 GB slices, or any other suitable slice sizes. The pooled memory controller may assign or revoke assignment of slices to compute nodes based on an assignment/revocation policy associated with pooled memory system 180. A portion of memory may be un-assigned from a compute node based on (1) recency and/or frequency of use (e.g., never-used slice, least-recently or least-frequently used slice(s)), (2) recency of assignment (e.g., least-recently assigned slice(s)), (3) a logical assessment of impact on future latencies, or (4) an assessment latency/timing of transfer to bulk memory, etc.

As explained earlier, the data/instructions associated with a host OS may be swapped in and out of the local memory from/to the pooled memory. In such an arrangement, the local memory may be viewed as the "Near Memory" and the pooled memory may be viewed as the "Far Memory." In this arrangement, the near memory (e.g., the local memory) may be implemented using expensive memory and the far memory (e.g., the pooled memory) may be implemented using cheaper memory.

In one example, compute nodes 110, 140, and 170 may be part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical compute nodes. Thus, a cluster may include compute nodes including a certain number of CPU cores and a certain amount of memory. Instead of compute nodes, other types of hardware such as edge-compute devices, on-premises servers, or other types of systems, including communications systems, such as base stations (e.g., 5G or 6G base stations) may also be used. Although FIG. 1 shows system 100 as having a certain number of components, including compute nodes and memory components, arranged in a certain manner, system 100 may include additional or fewer components, arranged differently.

Figure 2:
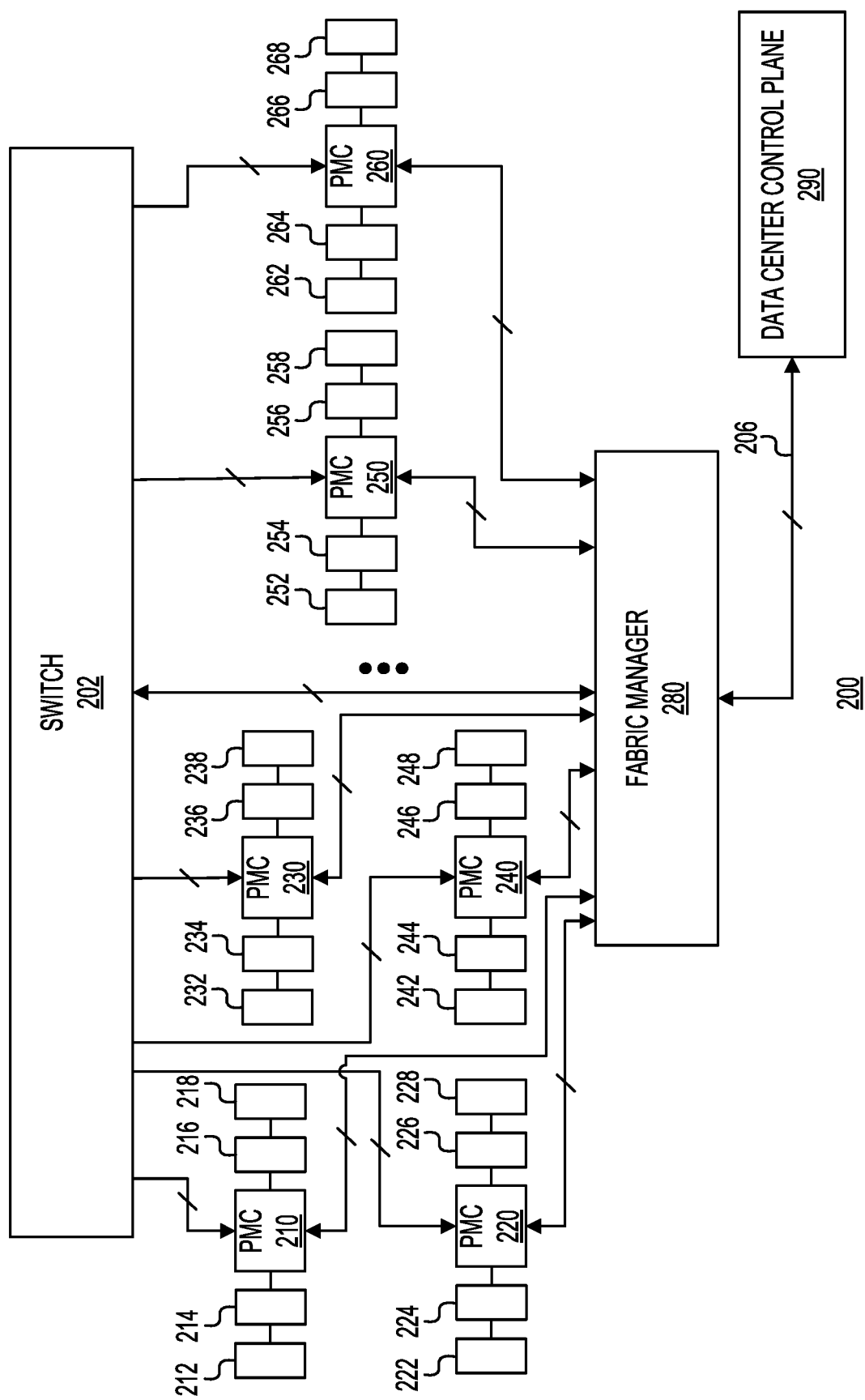
FIG. 2 shows a block diagram of an example pooled memory system.

FIG. 2 shows a block diagram of an example pooled memory system 200 corresponding to the pooled memory system 180 shown in FIG. 1. Pooled memory system 200 may include a switch 202 for coupling the pooled memory system controllers to compute nodes (e.g., compute nodes 110, 130, and 150 of FIG. 1). Pooled memory system 200 may further include several pooled memory controllers and associated pooled memory modules. As an example, pooled memory system 200 may include pooled memory controller (PMC) 210, PMC 220, PMC 230, PMC 240, PMC 250, and PMC 260 coupled to switch 202, as shown in FIG. 2. Each of PMC 210, PMC 220, PMC 230, PMC 240, PMC 250, and PMC 260 may further be coupled to fabric manager 280. PMC 210 may further be coupled to memory modules 212, 214, 216, and 218. PMC 220 may further be coupled to memory modules 222, 224, 226, and 228. PMC 230 may further be coupled to memory modules 232, 234, 236, and 238. PMC 240 may further be coupled to memory modules 242, 244, 246, and 248. PMC 250 may further be coupled to memory modules 252, 254, 256, and 258. PMC 260 may further be coupled to memory modules 262, 264, 266, and 268. Each memory module may be a dual-in-line memory module (DIMM) or a single-in-line memory module (SIMM).

With continued reference to FIG. 2, in one example, each of the pooled memory controllers may be implemented as a Compute Express Link (CXL) specification compliant pooled memory controller. In this example, each of the memory modules associated with pooled memory system 200 may be configured as Type 3 CXL devices. Fabric manager 280 may communicate via bus 206 with data center control plane 290. In one example, fabric manager 280 may be implemented as a CXL specification compliant fabric manager. Control information received from data center control plane 290 may include control information specifying which slices of memory from the memory pool are allocated to any particular compute node at a given time. In response to this control information, fabric manager 280 may allocate a slice of memory from within the pooled memory to a specific compute node in a time-division multiplexed fashion. In other words, at a time a particular slice of memory could only be allocated to a specific compute node and not to any other compute nodes. As part of this example, transactions associated with CXL.io protocol, which is a PCIe-based non-coherent I/O protocol, may be used to configure the memory devices and the links between the CPUs and the memory modules included in pooled memory system 200. The CXL.io protocol may also be used by the CPUs associated with the various compute nodes in device discovery, enumeration, error reporting, and management. Alternatively, any other I/O protocol that supports such configuration transactions may also be used. The memory access to the memory modules may be handled via the transactions associated with CXL.mem protocol, which is a memory access protocol that supports memory transactions. As an example, load instructions and store instructions associated with any of the CPUs may be handled via CXL.mem protocol. Alternatively, any other protocols that allow the translation of the CPU load/store instructions into read/write transactions associated with memory modules included in pooled memory system 200 may also be used.

Each pooled memory controller (e.g., any of PMC 210, PMC 220, PMC 230, PMC 240, PMC 250, and PMC 260) may maintain a segment table indicating different portions of the pooled memory that may be assigned/un-assigned, at any suitable granularity with regard to portion sizes. More generally, the pooled memory controller may maintain any suitable table representing available/assigned memory slices, indicating any relevant information pertaining to slices (e.g., assigned/unassigned status, ownership status indicating which compute node an assigned slice is assigned to, recency of use information, recency of assignment information, host type or other metadata pertaining to the compute node the assigned slice is assigned to). For example, for a 2 TB memory pool, portions may be assigned/unassigned at a 1 GB slice granularity, e.g., there may be 2K (e.g., 2048) segments in the segment table indicating different 1 GB slices. As an example, a segment in the segment table may comprise a 32-bit segment identifier that includes 8 bits indicating which host a portion is assigned to, a 1-bit value indicating whether the portion was ever accessed, a 3-bit decoder map indicating a target address decoding scheme for addressing data in the portion, and/or a 16-bit leaky bucket counter indicating a count value of recent accesses to the portion. For example, the segment table described above may comprise an 8 KB region of SRAM of the pooled memory controller. The above-described schema for a segment table is non-limiting, and the segment table may comprise any suitable data for tracking assignment of memory. Although FIG. 2 shows pooled memory system 200 as having a certain number of components, including pooled memory controllers and memory modules, arranged in a certain manner, pooled memory system 200 may include additional or fewer components, arranged differently. As an example, switch 202 may not be an integrated part of pooled memory system 200, and this switch instead, may be a separate component. In addition, multiple switches may be used. Moreover, fabric manager 280 may be shared with additional or fewer pooled memory controllers.

Figure 3:
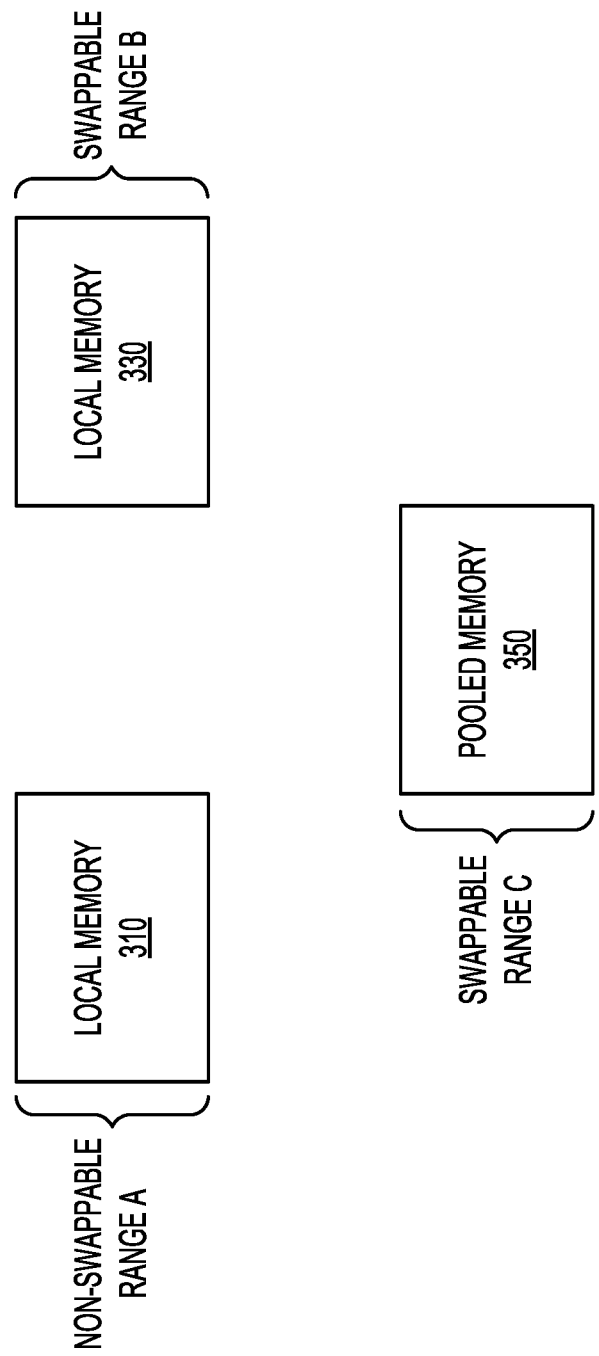
FIG. 3 shows an example memory arrangement for use with the pooled memory system.

FIG. 3 shows an example memory arrangement 300 for use with the pooled memory system of FIG. 2 in the context of system 100 of FIG. 1. Memory arrangement 300 may include ranges of memory that can include either local memory or the pooled memory that each host OS may access. In addition, each memory location may fall within a range that may be a swappable range or a non-swappable range within the context of direct swap caching. In this example, memory arrangement 300 may include local memory 310 corresponding to non-swappable range A, local memory 330 corresponding to swappable range B, and pooled memory 350 corresponding to swappable range C. Local memory 310 and local memory 330 may correspond to the local memory modules described earlier with respect to FIG. 1. Pooled memory 350 may correspond to the pooled memory modules described earlier with respect to FIG. 2. Each host OS may access some or all of the total amount of memory locally attached to the corresponding compute node (e.g., the combination of local memory 310 corresponding to non-swappable range A and local memory 330 corresponding to swappable range B). In addition, the host OS may have access to some or all of the pooled memory (e.g., pooled memory 350 corresponding to swappable range C). In general, at any given time, a portion of the memory from the memory pool can be allocated to only one host OS at a time. Thus, the total capacity that is addressable by each host OS is the combination of local memory 310 corresponding to non-swappable range A, local memory 330 corresponding to swappable range B, and pooled memory 350 corresponding to swappable range C.

With continued reference to FIG. 3, in this example, in order to use direct swap caching in the context of system 100 of FIG. 1, a part of the locally attached memory must have a fixed ratio with the pooled memory. In this example, it is assumed that local memory 330 corresponding to the swappable range B has the same size as pooled memory 350 corresponding to the swappable range C. Thus, the total swappable range is the sum of the swappable range B and the swappable range C, and the non-swappable range includes only the non-swappable region A. This means that in this example any access to memory within non-swappable range A will be guaranteed to get a "hit" in the local memory (since this range is not being swapped). Any access to a location in memory within swappable range B and swappable range C will operate in the direct swap cache manner. Thus, these accesses will first perform a lookup within the memory designated as the near memory. A hit in the near memory will be serviced directly out of the local memory, whereas a miss in the near memory will cause a swap operation between the corresponding far memory and near memory locations.

Swapping operations (e.g., swapping data from the locations in the far memory into the locations in the near memory or swapping data out from the locations in the near memory into the locations in the far memory) may be performed at a granularity level of a cache line. Each cache line may include a combination of a data portion (e.g., 512 bits) and a metadata portion (e.g., 128 bits). The data portion may contain data representing user data or instructions executed by a compute node. The metadata portion may include data representing various attributes of the data in the data portion. The metadata portion can also include error checking and correction bits or other suitable types of information. In addition, the metadata portion may include a tag having an appropriate number of bit(s) to distinguish between the location of a cache line. In this example, since the swappable memory region B (corresponding to local memory 330) has the same size as the swappable memory region C (corresponding to pooled memory 350) (a ratio of 1), a single bit may be used. Thus, a logical value of "1" may indicate that the cache line is in a location corresponding to the "near memory whereas a logical value of "0" may indicate that the cache line is in a location corresponding to the far memory. In one example, each compute node may have twelve memory modules each with 96 GB capacity. Thus, each compute node may access 12×96

GB=approximately 1.1 TB of memory. Assuming a 1:1 ratio between the near memory and the far memory, the pooled memory may also be approximately 512 GB. Thus, the total addressable memory for each compute node may be the sum of the local memory (1.1 TB) and the pooled memory (512 GB), i.e., approximately 1.6 TB. In this case, the swappable range B may be 512 GB, and the swappable range C may also be 512 GB, and the two will operate in the direct swap cache manner. The present disclosure, however, is not limited to the use of a fixed ratio of 1:1 between the near memory and the far memory. As an example, a ratio of 1:3 may be used. In such a case, additional tag bits may be required to encode the information concerning the location of the cache line in terms of the region of the memory having the cache line.

The read and write operations with memory pooling and direct swap caching are described assuming a fixed ratio of 1:3 between the near memory and the far memory. Thus, in this example, as part of a system map, a range of addresses is covered by a combination of near memory (e.g., the local memory) to the far memory (e.g., the pooled memory) in the ratio of 1:3. The range is divided into four quadrants (Q1, Q2, Q3, and Q4) such that up to four cache lines located at four different addresses (one from each quadrant) can map to the same location in the near memory. However, each location can have only one of the four cache lines at a given time. The other three cache lines are present in the pooled memory in three possible locations. Consistent with the earlier example, each cache line includes a data portion and a tag portion. The bit values corresponding to the tag indicate where each of the four cache lines is currently residing. Table 1 below shows example bit values for the tag portion and corresponding location of the cache line.

TABLE 1

| Bit 1 | Bit 2 | Quadrant |
|---|---|---|
| 0 | 0 | Q1 (local memory) |
| 0 | 1 | Q2 (pooled memory) |
| 1 | 0 | Q3 (pooled memory) |
| 1 | 1 | Q3 (pooled memory) |

Although Table 1 shows one type of encoding for relating bit values to quadrants, other tag encodings may also be used. In addition, the ratio between the near memory to the far memory may be 1:N, where N is an integer in a range between 1 to 9.

Figure 4:
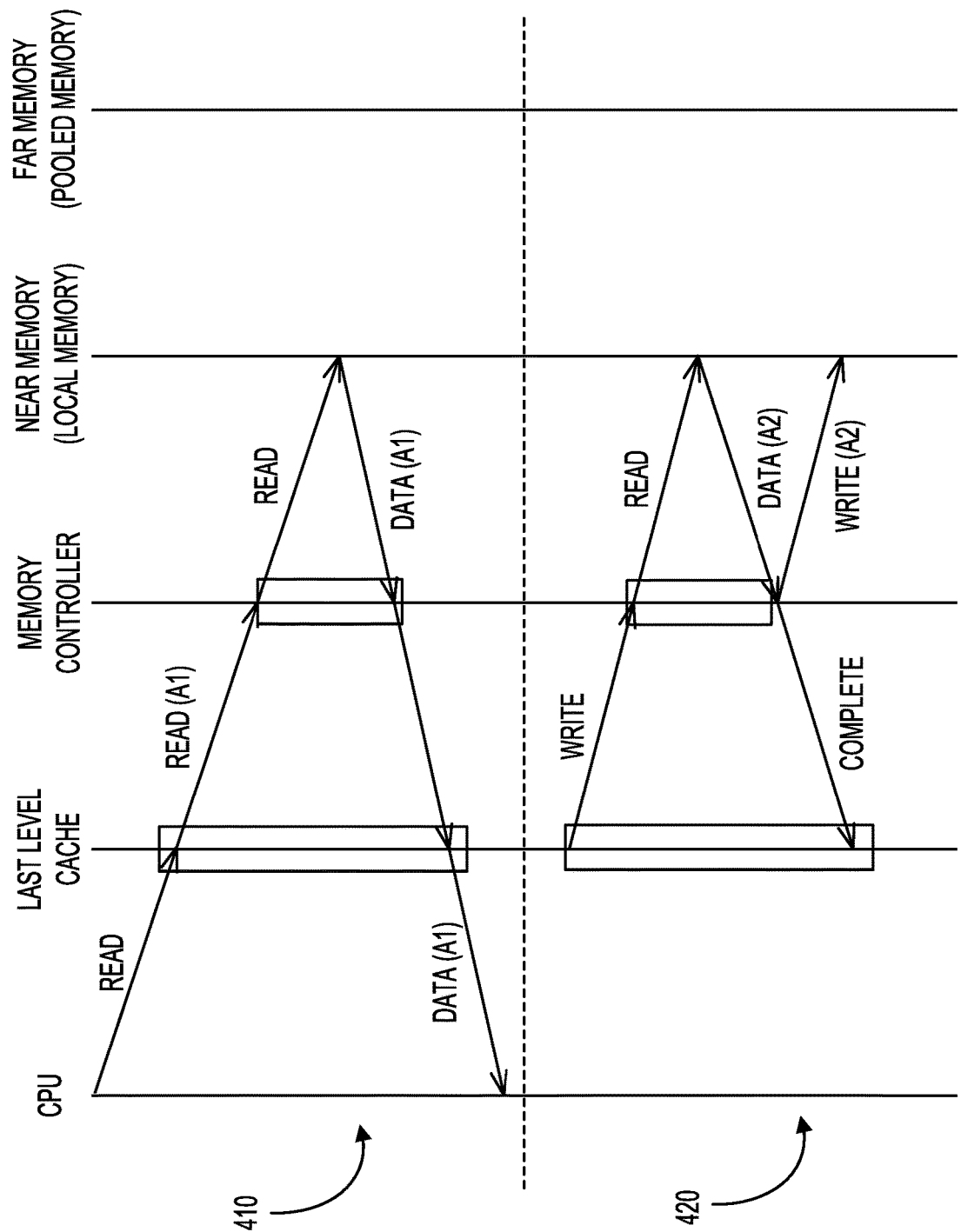
FIG. 4 is a diagram showing a transaction flow related to a read operation and a write operation when the location of the data is in the near memory (e.g., the local memory) in accordance with one example.

FIG. 4 is a diagram showing a transaction flow 400 related to a read operation and a write operation when the location of the data is in the near memory (e.g., the local memory). This example corresponds to the above example of a 1:3 ratio between the near memory and the far memory. The transactions associated with the read operation are shown in portion 410 of transaction flow 400 and the transactions associated with the write operation are shown in flow portion 420 of transaction flow 400. During a read operation, a CPU (e.g., any of CPUs 112, 142, or 172 of FIG. 1) can issue a command to a memory controller (e.g., any of memory controllers 118, 148, and 178 of FIG. 1) to read data corresponding to address A1. Upon the read operation resulting in a miss with respect to the last level cache, address A1 is first decoded to the near memory (e.g., any of the local memory associated with the CPU). The read from the local memory location results in a retrieval of a cache line including both the data portion and the metadata portion (including the tag). In this case, the tag indicates that the data portion corresponds to the address being looked up and hence it is a hit. As a result, the data in the cache line is returned to the requesting CPU. As shown in portion 420 of transaction flow 400, when a cache line is being written to the memory, every write operation needs to be preceded by a read operation to ensure that the memory location contains the address being written. In this case, the data is being written to address A2, which is located within the near memory and thus the write operation is also a hit.

Figure 5:
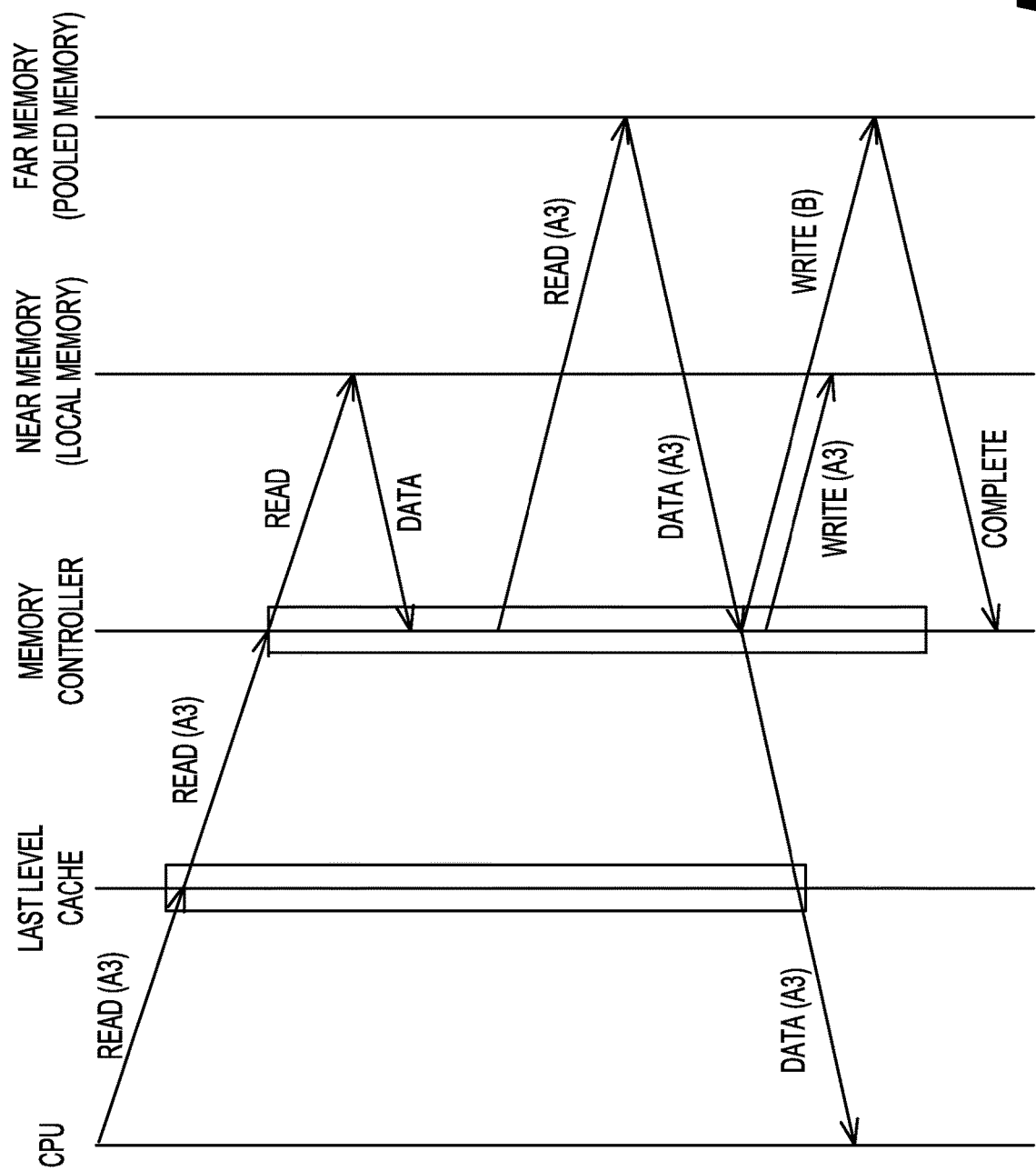
FIG. 5 is a diagram showing a transaction flow relating to the transactions that occur when the data associated with a read operation is located in the far memory (e.g., the pooled memory) in accordance with one example.

FIG. 5 is a diagram showing a transaction flow 500 relating to the transactions that occur when the data associated with a read operation is located in the far memory (e.g., the pooled memory). If the tag indicates that the near memory location does not contain the address of the data being requested, then it is a miss. Upon a miss, to prevent conflict and race conditions, a blocking entry may be set in the memory controller for the four entries that map to the memory location in the local memory. Next, the tag may be used to decode which location in the pooled memory contains the data corresponding to the address being requested. As described earlier, the pooled memory may be implemented as CXL compliant type 3 devices. In such an implementation, memory controller may spawn a CXL.mem read request to the appropriate address. Once the data is retrieved, the data is sent to the original requester and thus completes the read operation. The data is also written to the near memory and the original data read from the local memory is written to the same location in the pooled memory from which the read happened—thereby performing the cache line swap.

Figure 6:
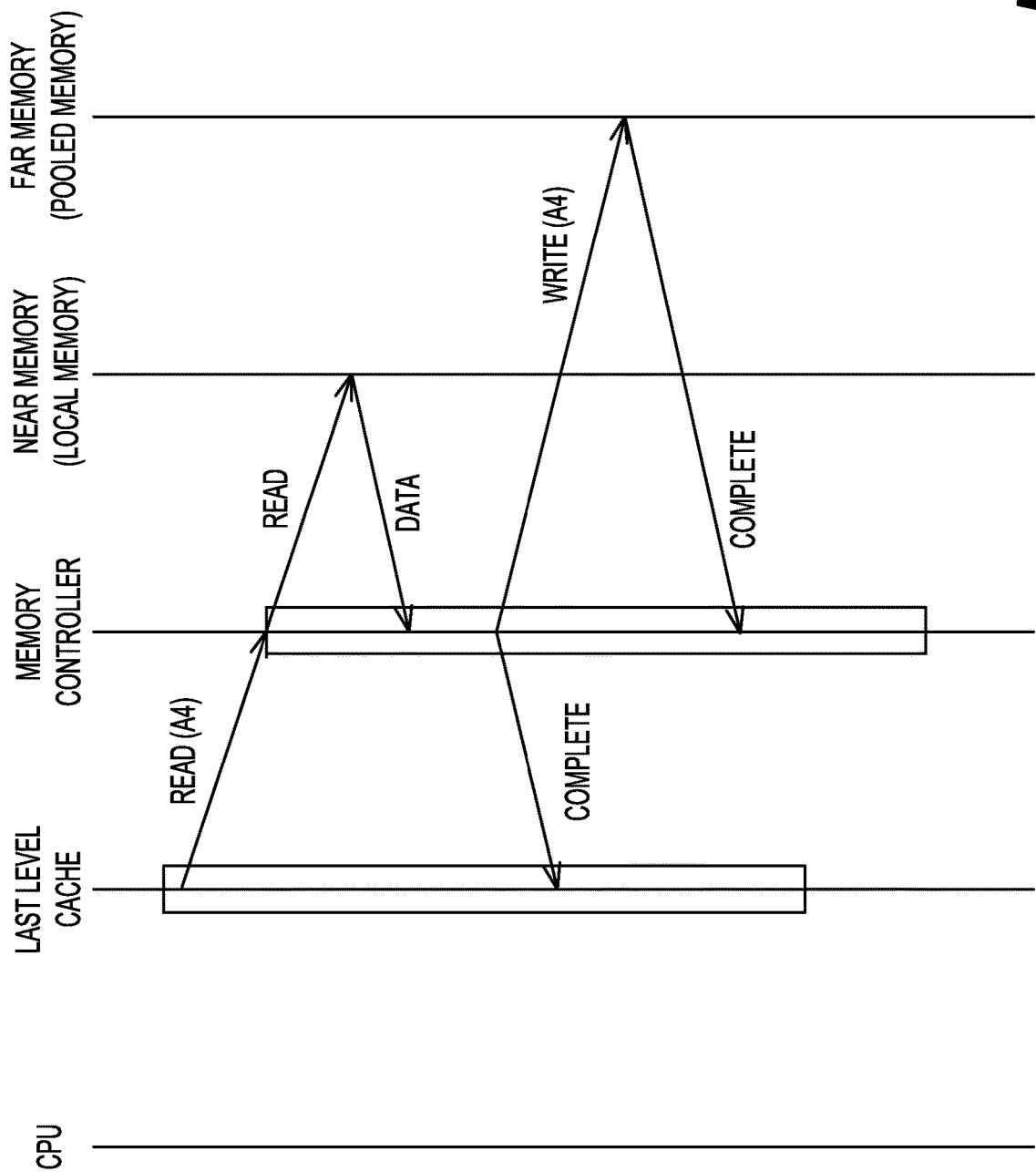
FIG. 6 is a diagram showing a transaction flow relating to the transactions that occur when the data associated with a write operation is located in the far memory (e.g., the pooled memory) in accordance with one example.

FIG. 6 is a diagram showing a transaction flow 600 relating to the transactions that occur when the data associated with a write operation is located in the far memory (e.g., the pooled memory). For a write (e.g., write (A3)) that misses the near memory (local memory), the data is written to the far memory (pooled memory). However, as explained earlier, not all slices within the pooled memory can be allocated to a given compute node at a time. Accordingly, not all slices within the pooled memory can be allocated to a host OS being executed by a given compute node at a time. When a slice is offline, the host OS does not have access to that region of memory and no accesses are made to that slice. Hence, the corresponding local memory (e.g., local memory 310 or local memory 330 of FIG. 3) services requests normally without any swapping operation. When a slice is brought online, the host OS can start using it. However, since local memory 330 acts as a swap cache for pooled memory 350, the memory controller will start swapping cache lines between local memory 330 and pooled memory 350. These operations are transparent and seamless based on how the hardware address decoders are set up at boot-time.

A slice of memory may be taken offline by the pooled memory system in response to a change in resource allocations initiated via data center control plane 290 of FIG. 2 described earlier. A slice of memory may be 1 GB, 2 GB, or may have another size that is suitable for a particular set up. As such, a single slice of memory may accommodate many cache lines, and a single memory module may accommodate many slices of memory. In this example, as part of taking a slice offline, a control component (e.g., fabric manager 280 of FIG. 2) sends a notification to the pooled memory controller (e.g., any of the PMCs described earlier with respect to FIG. 2) requesting the slice of memory back. As a result, the notified PMC forwards the request to the host OS running on a compute node. The host OS checks to ensure that no compute entity (e.g., an application) is using any memory associated with the slice that will be taken offline. If any portion of the slice is being used, then the host OS works with the application to take back that memory slice from the application and assign some other memory to the application. Once the host OS has taken back the memory, the host OS updates its address map to reflect the fact that the particular slice of memory is now not available for use with the host OS. The host OS also notifies the pooled memory controller (e.g., any of the PMCs described earlier with respect to FIG. 2) that the slice can be taken offline. In response, the PMC notifies the fabric manager that the slice is now free. Once the slice is offline, the host OS will take the address range corresponding to that slice out of its page tables so that applications being run on the host OS cannot access that memory.

When a slice is taken offline, this creates a problem though. This is because the local memory (e.g., locations associated with the swappable region of the local memory) may have some cached versions of the slice that was just taken offline. In addition, some of the content from the local memory may have been swapped out to the pool memory. As part of taking the slice offline (which may be orchestrated through the memory device driver), as part of this disclosure, the data-mover offload engine (DMOE) (e.g., any of DMOE 116, 146, or 176 of FIG. 1) is used to perform a cleanup operation that restores the state of local memory content to the local memory and moves content brought from the pool memory back out to the pool memory. Since this cleanup operation is performed on slices (GBs in size), it can be offloaded to the data-mover offload engine (DMOE) (e.g., any of DMOE 116, 146, or 176). In sum, taking a slice back from a compute node consists of three steps. The first step relates to the memory device driver requesting the host OS to offline a slice. As part of the second step, if the request is accepted, then the memory device driver submits a command to the data-mover offload engine (DMOE) (e.g., any of DMOE 116, 146, or 176) to perform the aforementioned cleanup operation. As part of the third step, the DMOE performs the requested cleanup operation. Once the cleanup operation has been finished, the pooled memory system can successfully re-assign that slice to another compute node. Once the slice of memory is assigned to another compute node, the fabric manager may notify the host OS indicating the availability of the slice of memory. The host OS may then bring the slice online—meaning that the host OS may now map the address range corresponding to the slice to its page table so that the applications running on the host OS can access that memory. The use of a dedicated component, in the form of the DMOE, may allow the CPUs and the memory controllers to offload the cleanup operation to the DMOE. This may allow the CPUs and the memory controllers to offload the processing overhead associated with the cleanup operation and stay focused on serving the processing and memory requirements of the applications being executed using by a compute node. As an example, any CPU clock cycles used for the cleanup operation are freed up by the DMOE, allowing the CPU to perform other tasks associated with the compute node.

Figure 7:
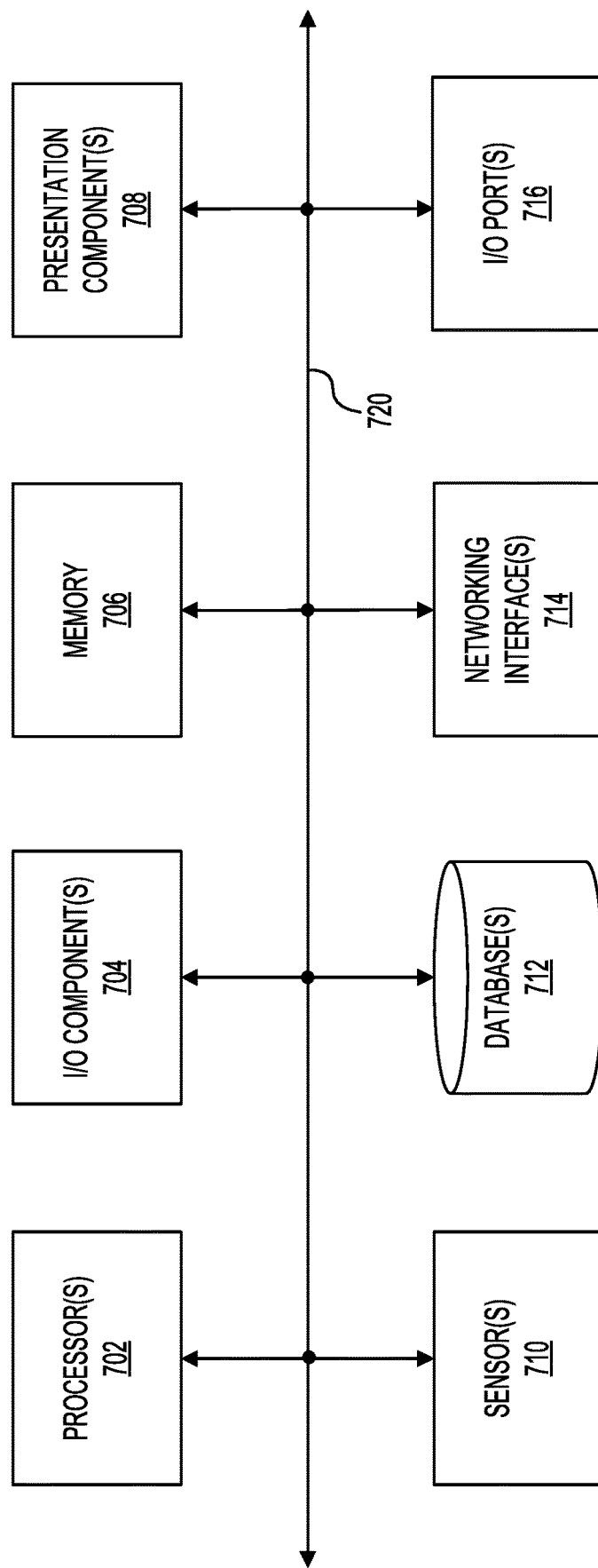
FIG. 7 shows a block diagram of an example system for implementing at least some of the methods for integrated memory pooling and direct swap caching.

FIG. 7 shows a block diagram of an example system 700 for implementing at least some of the methods for integrated memory pooling and direct swap caching. System 700 may include processor(s) 702, I/O component(s) 704, memory 706, presentation component(s) 708, sensors 710, database(s) 712, networking interfaces 714, and I/O port(s) 716, which may be interconnected via bus 720. Processor(s) 702 may execute instructions stored in memory 706. I/O component(s) 704 may include components such as a keyboard, a mouse, a voice recognition processor, or touch screens. Memory 706 may be any combination of non-volatile storage or volatile storage (e.g., flash memory, DRAM, SRAM, or other types of memories). Presentation component(s) 708 may include displays, holographic devices, or other presentation devices. Displays may be any type of display, such as LCD, LED, or other types of display. Sensor(s) 710 may include telemetry or other types of sensors configured to detect, and/or receive, information (e.g., collected data). Sensor(s) 710 may include telemetry or other types of sensors configured to detect, and/or receive, information (e.g., memory usage by various compute entities being executed by various compute nodes in a data center). Sensor(s) 710 may include sensors configured to sense conditions associated with CPUs, memory or other storage components, FPGAs, motherboards, baseboard management controllers, or the like. Sensor(s) 710 may also include sensors configured to sense conditions associated with racks, chassis, fans, power supply units (PSUs), or the like. Sensor(s) 710 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 7, database(s) 712 may be used to store any of the data collected or logged and as needed for the performance of methods described herein. Database(s) 712 may be implemented as a collection of distributed databases or as a single database. Network interface(s) 714 may include communication interfaces, such as Ethernet, cellular radio, Bluetooth radio, UWB radio, or other types of wireless or wired communication interfaces. I/O port(s) 716 may include Ethernet ports, Fiber-optic ports, wireless ports, or other communication or diagnostic ports. Although FIG. 7 shows system 700 as including a certain number of components arranged and coupled in a certain way, it may include fewer or additional components arranged and coupled differently. In addition, the functionality associated with system 700 may be distributed, as needed.

Figure 8:
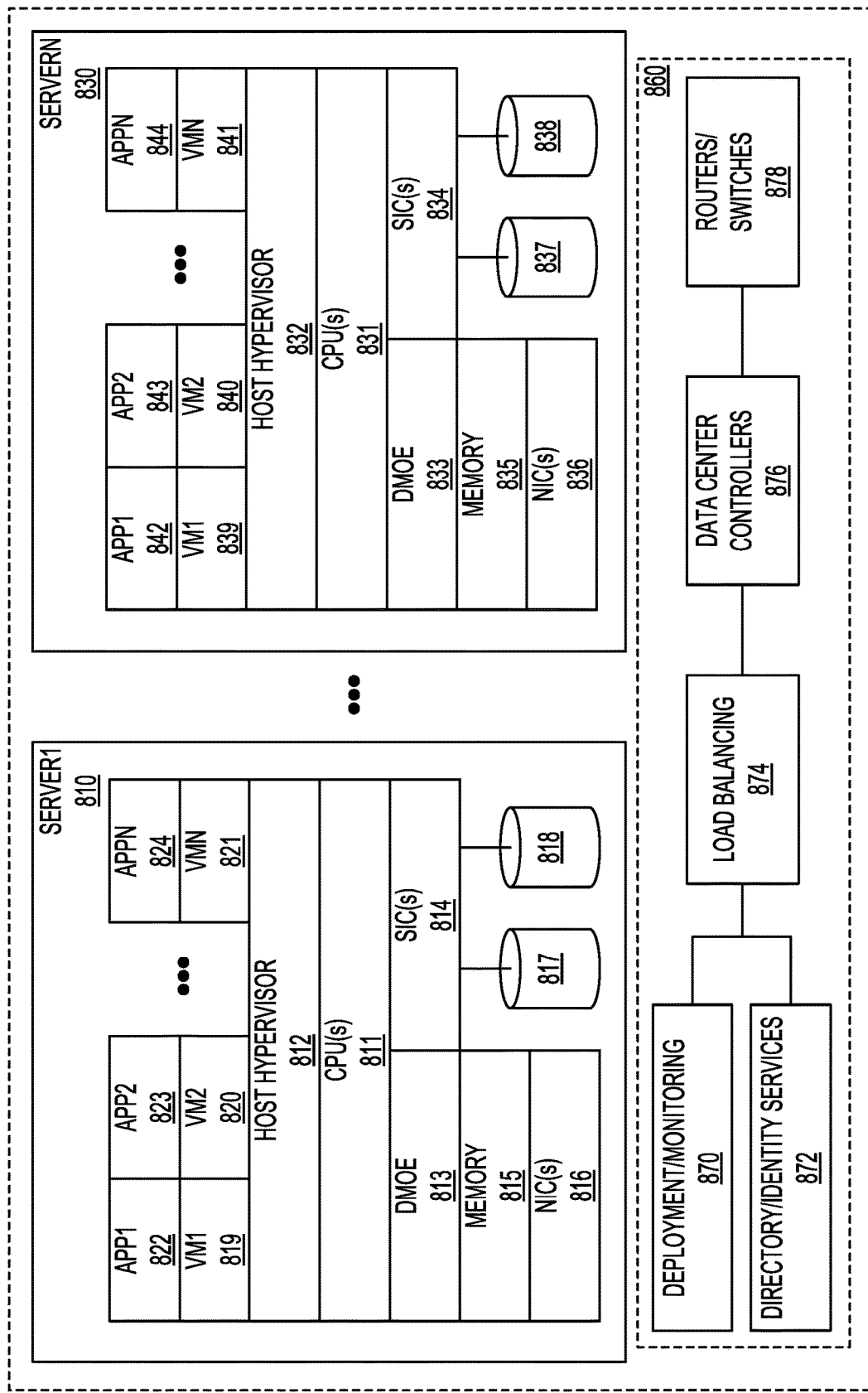
FIG. 8 shows a data center for implementing a system for integrated memory pooling and direct swap caching in accordance with one example.

FIG. 8 shows a data center 800 for implementing a system for integrated memory pooling and direct swap caching in accordance with one example. As an example, data center 800 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 800 may include server1 810 and serverN 830. Data center 800 may further include data center related functionality 860, including deployment/monitoring 870, directory/identity services 872, load balancing 874, data center controllers 876 (e.g., software defined networking (SDN) controllers and other controllers), and routers/switches 878. Server1 810 may include CPU(s) 811, host hypervisor 812, DMOE 813, storage interface controller(s) (SIC(s)) 814, memory 815, network interface controller(s) (NIC(s)) 816, and storage disks 817 and 818. Memory 815 may be implemented as a combination of local memory and pooled memory, as explained earlier. ServerN 830 may include CPU(s) 831, host hypervisor 832, DMOE 833, storage interface controller(s) (SIC(s)) 834, memory 835, network interface controller(s) (NIC(s)) 836, and storage disks 837 and 838. Memory 835 may be implemented as a combination of local memory and pooled memory, as explained earlier. Server1 810 may be configured to support virtual machines, including VM1 819, VM2 820, and VMN 821. The virtual machines may further be configured to support applications, such as APP1 822, APP2 823, and APPN 824. ServerN 830 may be configured to support virtual machines, including VM1 839, VM2 840, and VMN 841. The virtual machines may further be configured to support applications, such as APP1 842, APP2 843, and APPN 844.

With continued reference to FIG. 8, in one example, data center 800 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 8 shows data center 800 as including a certain number of components arranged and coupled in a certain way, it may include fewer or additional components arranged and coupled differently. In addition, the functionality associated with data center 800 may be distributed or combined, as needed.

FIG. 9 shows a flow chart 900 of an example method for integrated memory pooling and direct swap caching. In one example, steps associated with this method may be executed by various components of the systems described earlier (e.g., system 100 of FIG. 1 and system 200 of FIG. 2). Step 910 may include assigning to a compute node, comprising a local memory, pooled memory from within a pool of memory. As explained earlier, pooled memory system 180 of FIG. 1 may assign a portion of the pooled memory to the compute node when the compute node powers on or as part of allocation/deallocation operations. The assigned amount of memory may be specified by the data center control plane in a scenario where the compute node is part of a data center. The assigned portion may include one or more "slices" of memory, where a slice refers to any smallest granularity of portions of memory managed by the pooled memory controller (e.g., a memory page or any other block of memory aligned to a slice size) Any suitable slice size may be used, including 1 GB slices, 2 GB slices, 8 GB slices, or any other suitable slice sizes.

Step 920 may include granting to a host operating system access to: (1) a first swappable range of memory addresses associated with the local memory and a non-swappable range of memory addresses associated with the local memory, and (2) a second swappable range of memory addresses associated with the pooled memory. As part of this step, the host OS may be granted access to some or all of the total amount of memory locally attached to the corresponding compute node (e.g., the combination of local memory 310 of FIG. 3 corresponding to non-swappable range A and local memory 330 of FIG. 3 corresponding to swappable range B). In addition, the host OS may be granted access to some or all of the pooled memory (e.g., pooled memory 350 of FIG. 3 corresponding to swappable range C). In general, as explained earlier at any given time, a portion of the memory from the memory pool can be allocated to only one host OS at a time. Thus, the total capacity that is addressable by each host OS is the combination of local memory 310 corresponding to non-swappable range A, local memory 330 corresponding to swappable range B, and pooled memory 350 corresponding to swappable range C.

Step 930 may include using a dedicated data-mover offload engine, in response to a slice of memory being taken offline with respect to the host OS, automatically performing a cleanup operation, including: (1) restoring a state of any memory content swapped-out from a memory location within the first swappable range of memory addresses to the pooled memory, and (2) moving from the local memory any memory content swapped-in from a memory location within the second swappable range of memory addresses back out to the pooled memory. As explained earlier, the local memory (e.g., locations associated with the swappable region of the local memory) may have some cached versions of the slice that was just taken offline. In addition, some of the content from the local memory may have been swapped out to the pool memory. As part of taking the slice offline (which may be orchestrated through the memory device driver), as part of this step, the data-mover offload engine (DMOE) (e.g., any of DMOE 116, 146, or 176 of FIG. 1) is used to perform a cleanup operation that restores the state of local memory content to the local memory and moves content brought from the pool memory back out to the pool memory. Since, as part of this example, this cleanup operation is performed on slices (GBs in size), it can be offloaded to the data-mover offload engine (DMOE) (e.g., any of DMOE 116, 146, or 176 of FIG. 1). The use of a dedicated component, in the form of the DMOE, may allow the CPUs and the memory controllers to offload the cleanup operation to the DMOE. This may allow the CPUs and the memory controllers to offload the processing overhead associated with the cleanup operation and stay focused on serving the processing and memory requirements of the applications being executed using by a compute node. As an example, as noted earlier, any CPU clock cycles used for the cleanup operation are freed up by the DMOE, allowing the CPU to perform other tasks associated with the compute node.

In conclusion, the present disclosure relates to a system including a compute node comprising a local memory, coupled to a pooled memory system, where the pooled memory system comprises pooled memory. The system may further include a host operating system (OS) having initial access to: (1) a first swappable range of memory addresses associated with the local memory and a non-swappable range of memory addresses associated with the local memory, and (2) a second swappable range of memory addresses associated with the pooled memory.

The system may further include a data-mover offload engine configured to, in response to a slice of memory being taken offline with respect to the host OS, perform a cleanup operation, including: (1) restore a state of any memory content swapped-out from a memory location within the first swappable range of memory addresses to the pooled memory, and (2) move from the local memory any memory content swapped-in from a memory location within the second swappable range of memory addresses back out to the pooled memory.

As part of this system, a ratio of a size of the first swappable range of memory addresses associated with the local memory and a size of the second swappable range of memory addresses associated with the pooled memory may be fixed as part of granting the initial access to the host OS. In addition, the compute node may be configured to execute applications hosted by the host OS, where the compute node may comprise at least one central processing unit (CPU), and the data-mover offload engine may be dedicated for performing the cleanup operation such that the CPU is freed from performing any tasks related to the cleanup operation.

Each memory address associated with the host OS may correspond to an address of a cache line for use with the CPU. Each cache line may comprise a data portion and a metadata portion. The local memory may be configured as a near memory and the pooled memory may be configured as a far memory. The metadata portion may comprise a tag configured to determine whether a specific cache line is stored in the near memory or the far memory.

In another example, the present disclosure relates to a method including assigning to a compute node, comprising a local memory, pooled memory from within a pool of memory. The method may further include granting to a host operating system (OS) access to: (1) a first swappable range of memory addresses associated with the local memory and a non-swappable range of memory addresses associated with the local memory, and (2) a second swappable range of memory addresses associated with the pooled memory.

The method may further include using a dedicated data-mover offload engine, in response to a slice of memory being taken offline with respect to the host OS, automatically performing a cleanup operation, including: (1) restoring a state of any memory content swapped-out from a memory location within the first swappable range of memory addresses to the pooled memory, and (2) moving from the local memory any memory content swapped-in from a memory location within the second swappable range of memory addresses back out to the pooled memory.

As part of this method, a ratio of a size of the first swappable range of memory addresses associated with the local memory and a size of the second swappable range of memory addresses associated with the pooled memory may be fixed as part of granting the initial access to the host OS. In addition, the compute node may be configured to execute applications hosted by the host OS, where the compute node may comprise at least one central processing unit (CPU), and the data-mover offload engine may be dedicated for performing the cleanup operation such that the CPU is freed from performing any tasks related to the cleanup operation.

Each memory address associated with the host OS may correspond to an address of a cache line for use with the CPU. Each cache line may comprise a data portion and a metadata portion. The local memory may be configured as a near memory and the pooled memory may be configured as a far memory. The metadata portion may comprise a tag configured to determine whether a specific cache line is stored in the near memory or the far memory.

In yet another example, the present disclosure relates to a system including a first compute node comprising a first local memory, coupled to a pooled memory system, where the pooled memory system comprises pooled memory. The system may further include a first host operating system (OS), associated with the first compute node, having initial access to: (1) a first swappable range of memory addresses associated with the first local memory and a first non-swappable range of memory addresses associated with the first local memory, and (2) a second swappable range of memory addresses associated with the pooled memory. The system may further include a second compute node comprising a second local memory, different from the first local memory, coupled to the pooled memory system. The system may further include a second host operating system (OS), associated with the second compute node, having initial access to: (1) a third swappable range of memory addresses associated with the second local memory and a third non-swappable range of memory addresses associated with the second local memory, and (2) a fourth swappable range of memory addresses associated with the pooled memory. The system may further include a first data-mover offload engine configured to, in response to a first slice of memory being taken offline with respect to the first host OS, perform a first cleanup operation, including: (1) restore a state of any memory content swapped-out from a memory location within the first swappable range of memory addresses to the pooled memory, and (2) move from the first local memory any memory content swapped-in from a memory location within the second swappable range of memory addresses back out to the pooled memory. The system may further include a second data-mover offload engine, different from the first data-mover engine, configured to, in response to a second slice of memory being taken offline with respect to the second host OS, perform a second cleanup operation, including: (1) restore a state of any memory content swapped-out from a memory location within the third swappable range of memory addresses to the pooled memory, and (2) move from the second local memory any memory content swapped-in from a memory location within the fourth swappable range of memory addresses back out to the pooled memory.

As part of this system, a first ratio of a size of the first swappable range of memory addresses associated with the first local memory and a size of the second swappable range of memory addresses associated with the pooled memory may be fixed as part of granting the initial access to the first host OS. In addition, as part of this system, a second ratio of a size of the third swappable range of memory addresses associated with the second local memory and a size of the fourth swappable range of memory addresses associated with the pooled memory is fixed as part of granting the initial access to the second host OS.

The first compute node may be configured to execute a first set of applications hosted by the first host OS, where the first compute node may comprise a first central processing unit (CPU), and the data-mover offload engine may be dedicated for performing the first cleanup operation such that the first CPU is freed from performing any tasks related to the first cleanup operation. The second compute node may be configured to execute a second set of applications hosted by the second host OS, where the second compute node may comprise a second central processing unit (CPU), and the second data-mover offload engine may be dedicated for performing the second cleanup operation such that the second CPU is freed from performing any tasks related to the second cleanup operation. Each of the first data-mover offload engine and the second data-mover offload engine may be implemented as a fixed-function accelerator.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
a compute node comprising a local memory, coupled to a pooled memory system, wherein the pooled memory system comprises pooled memory;
a host operating system (OS) having initial access to: (1) a first swappable range of memory addresses associated with the local memory and a non-swappable range of memory addresses associated with the local memory, and (2) a second swappable range of memory addresses associated with the pooled memory; and
a data-mover offload engine configured to, in response to a slice of memory being taken offline with respect to the host OS, perform a cleanup operation, including: (1) restore a state of any memory content swapped-out from a memory location within the first swappable range of memory addresses to the pooled memory, and (2) move from the local memory any memory content swapped-in from a memory location within the second swappable range of memory addresses back out to the pooled memory.

2. The system of claim 1, wherein a ratio of a size of the first swappable range of memory addresses associated with the local memory and a size of the second swappable range of memory addresses associated with the pooled memory is fixed as part of granting the initial access to the host OS.

3. The system of claim 1, wherein the compute node is configured to execute applications hosted by the host OS, wherein the compute node comprises at least one central processing unit (CPU), and wherein the data-mover offload engine is dedicated for performing the cleanup operation such that the CPU is freed from performing any tasks related to the cleanup operation.

4. The system of claim 3, wherein each memory address associated with the host OS corresponds to an address of a cache line for use with the CPU.

5. The system of claim 4, wherein each cache line comprises a data portion and a metadata portion.

6. The system of claim 5, wherein the local memory is configured as a near memory and the pooled memory is configured as a far memory.

7. The system of claim 6, wherein the metadata portion comprises a tag configured to determine whether a specific cache line is stored in the near memory or the far memory.

8. A system comprising:
a first compute node comprising a first local memory, coupled to a pooled memory system, wherein the pooled memory system comprises pooled memory;
a first host operating system (OS), associated with the first compute node, having initial access to: (1) a first swappable range of memory addresses associated with the first local memory and a first non-swappable range of memory addresses associated with the first local memory, and (2) a second swappable range of memory addresses associated with the pooled memory;
a second compute node comprising a second local memory, different from the first local memory, coupled to the pooled memory system;
a second host operating system (OS), associated with the second compute node, having initial access to: (1) a third swappable range of memory addresses associated with the second local memory and a third non-swappable range of memory addresses associated with the second local memory, and (2) a fourth swappable range of memory addresses associated with the pooled memory;
a first data-mover offload engine configured to, in response to a first slice of memory being taken offline with respect to the first host OS, perform a first cleanup operation, including: (1) restore a state of any memory content swapped-out from a memory location within the first swappable range of memory addresses to the pooled memory, and (2) move from the first local memory any memory content swapped-in from a memory location within the second swappable range of memory addresses back out to the pooled memory; and a second data-mover offload engine, different from the first data-mover engine, configured to, in response to a second slice of memory being taken offline with respect to the second host OS, perform a second cleanup operation, including: (1) restore a state of any memory content swapped-out from a memory location within the third swappable range of memory addresses to the pooled memory, and (2) move from the second local memory any memory content swapped-in from a memory location within the fourth swappable range of memory addresses back out to the pooled memory.

9. The system of claim 8, wherein a first ratio of a size of the first swappable range of memory addresses associated with the first local memory and a size of the second swappable range of memory addresses associated with the pooled memory is fixed as part of granting the initial access to the first host OS.

10. The system of claim 9, wherein a second ratio of a size of the third swappable range of memory addresses associated with the second local memory and a size of the fourth swappable range of memory addresses associated with the pooled memory is fixed as part of granting the initial access to the second host OS.

11. The system of claim 10, wherein the first compute node is configured to execute a first set of applications hosted by the first host OS, wherein the first compute node comprises a first central processing unit (CPU), and wherein the data-mover offload engine is dedicated for performing the first cleanup operation such that the first CPU is freed from performing any tasks related to the first cleanup operation.

12. The system of claim 11, wherein the second compute node is configured to execute a second set of applications hosted by the second host OS, wherein the second compute node comprises a second central processing unit (CPU), and wherein the second data-mover offload engine is dedicated for performing the second cleanup operation such that the second CPU is freed from performing any tasks related to the second cleanup operation.

13. The system of claim 12, wherein each of the first data-mover offload engine and the second data-mover offload engine is implemented as a fixed-function accelerator.

14. A method comprising:
assigning to a compute node, comprising a local memory, pooled memory from within a pool of memory;
granting to a host operating system (OS) access to: (1) a first swappable range of memory addresses associated with the local memory and a non-swappable range of memory addresses associated with the local memory, and (2) a second swappable range of memory addresses associated with the pooled memory; and
using a dedicated data-mover offload engine, in response to a slice of memory being taken offline with respect to the host OS, automatically performing a cleanup operation, including: (1) restoring a state of any memory content swapped-out from a memory location within the first swappable range of memory addresses to the pooled memory, and (2) moving from the local memory any memory content swapped-in from a memory location within the second swappable range of memory addresses back out to the pooled memory.

15. The method of claim 14, wherein a ratio of a size of the first swappable range of memory addresses associated with the local memory and a size of the second swappable range of memory addresses associated with the pooled memory is fixed as part of granting the initial access to the host OS.

16. The method of claim 15, wherein the compute node is configured to execute applications hosted by the host OS, wherein the compute node comprises at least one central processing unit (CPU), and wherein the data-mover offload engine is dedicated for performing the cleanup operation such that the CPU is freed from performing any tasks related to the cleanup operation.

17. The method of claim 16, wherein each memory address associated with the host OS corresponds to an address of a cache line for use with the CPU.

18. The method of claim 17, wherein each cache line comprises a data portion and a metadata portion.

19. The method of claim 18, wherein the local memory is configured as a near memory and the pooled memory is configured as a far memory.

20. The method of claim 19, wherein the metadata portion comprises a tag configured to determine whether a specific cache line is stored in the near memory or the far memory.

* * * * *